United States Patent [19]

Atkinson

[11] 4,341,239
[45] Jul. 27, 1982

[54] COMBINATION CHECK-OVERPRESSURE RELIEF VALVE

[75] Inventor: Gordon E. Atkinson, Yellow Springs, Ohio

[73] Assignee: Vernay Laboratories, Inc., Yellow Springs, Ohio

[21] Appl. No.: 168,981

[22] Filed: Jul. 14, 1980

[51] Int. Cl.³ ............................................. F16K 17/18
[52] U.S. Cl. ................................... 137/493; 137/846; 137/847
[58] Field of Search ............ 137/845, 846, 550, 493.1, 137/847, 848, 849, 850, 493

[56] References Cited

U.S. PATENT DOCUMENTS

| | | | |
|---|---|---|---|
| 3,155,110 | 11/1964 | Hoffman | 137/846 |
| 3,159,176 | 12/1964 | Russell et al. | 137/846 |
| 3,504,699 | 4/1970 | Grisé | 137/846 |
| 3,517,682 | 6/1970 | Smith | 137/846 |
| 4,181,145 | 1/1980 | Mitchell | 137/846 |

FOREIGN PATENT DOCUMENTS

| | | | |
|---|---|---|---|
| 140567 | 4/1951 | Australia | 137/846 |
| 902477 | 1/1954 | Fed. Rep. of Germany | 137/846 |

*Primary Examiner*—Samuel Scott
*Assistant Examiner*—J. Huang
*Attorney, Agent, or Firm*—Biebel, French & Nauman

[57] ABSTRACT

A combination check-overpressure relief valve includes a cylindrical main body portion defining a flow path through the valve and terminating in a curved lip portion having a radius of curvature extending perpendicularly to the flow path. The curved lip portion has a normally closed slit formed through it which opens to flow in one direction but checks flow in an opposite direction until a certain pressure is exceeded, at which the valve relieves to allow flow in the opposite direction. The valve will thereafter automatically reset to its original checking position once the pressure has dropped sufficiently. If desired the pressures at which flow can occur through the valve may be increased by providing the valve with stiffening ribs projecting radially outwardly of the main body portion.

9 Claims, 10 Drawing Figures

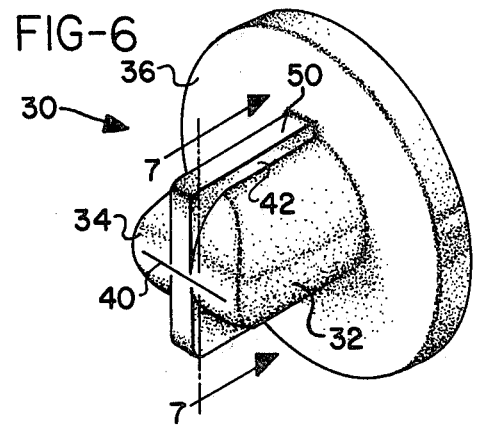
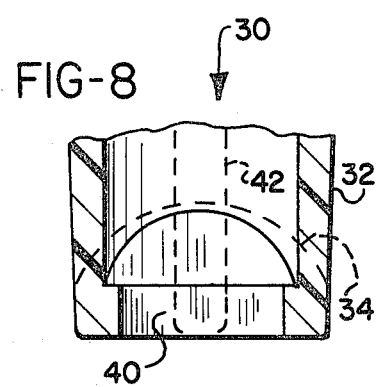
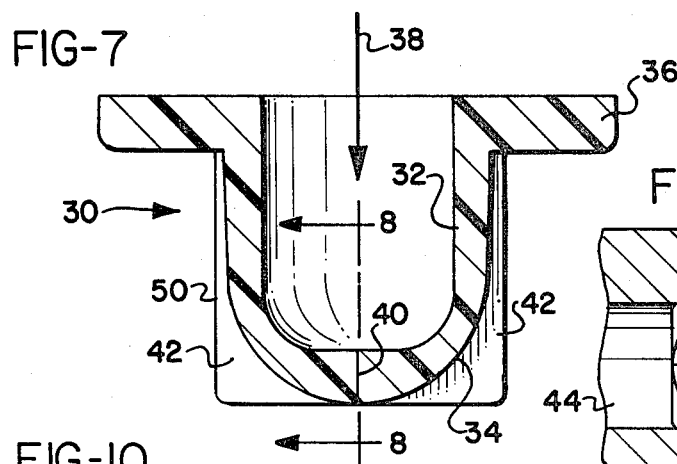
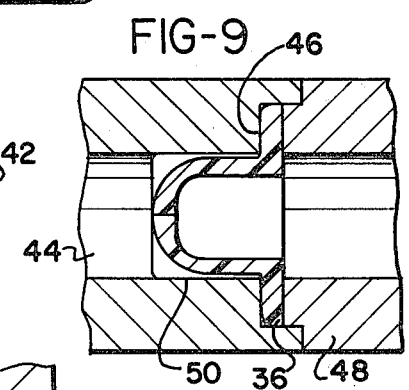
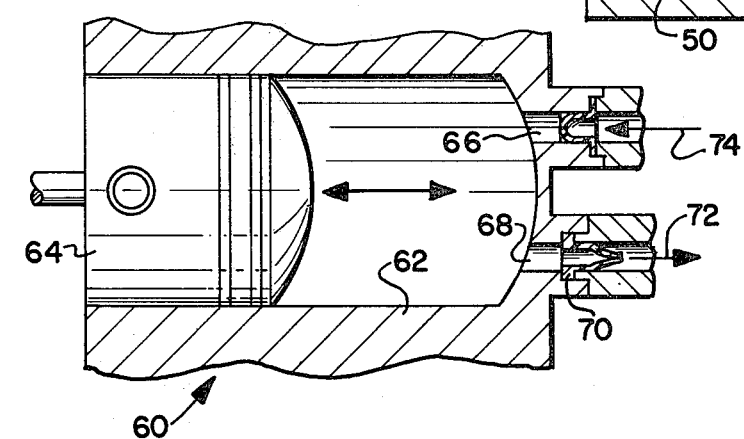

4,341,239

COMBINATION CHECK-OVERPRESSURE RELIEF VALVE

BACKGROUND OF THE INVENTION

One-way check valves of the so called "duck bill" type generally incorporate a hollow cylindrical body terminating in a duck bill which permits flow in one direction but checks flow in the opposite direction.

In some environments it is desirable to not only permit flow in one direction and check flow in the opposite direction, but to also provide for pressure relief when the flow pressure in the opposite direction exceeds a certain value.

U.S. Pat. No. 3,155,110 dated Nov. 3, 1964 discloses various embodiments of check-relief valves including a prior art mechanism that incorporates a coil spring and the improvement, which utilizes collapsible legs or feet. In both versions relief is provided by an axial shifting of the entire valve body.

U.S. Pat. No. 3,159,176 dated Dec. 1, 1964 discloses a check-relief duck bill valve in which pressure relief is accomplished, not by axial movement of the valve, but by the provision of a flexible umbrella portion which lifts off its seat at pressures in excess of some value to permit back flow around the outside of the body of the valve.

Obviously the use of a separate coil spring makes the valve assembly more complicated and expensive, while it is often impractical or even impossible to utilize a valve which relies upon axial movement of the entire valve or flow around the outside of the valve body to provide pressure relief.

SUMMARY OF THE INVENTION

The present invention provides an improved check-overpressure relief valve which eliminates the necessity of separate coil springs, axial movement of the entire valve and flow around the valve body, and permits overpressure relief flow through the hollow, cylindrical main body portion of the valve.

Specifically, the valve includes a hollow, cylindrical main body portion terminating in a curved lip portion having an axis of curvature extending perpendicularly to the flow path through the main body portion and including a normally closed slit extending in parallel relationship to the axis of curvature of the curved lip portion.

Preferably the curved lip portion has a substantially constant radius of curvature and the normally closed slit through the lip portion has a length less than the diameter of the cylindrical main body portion. Also, preferably, the end of the cylindrical main body portion opposite the curved lip portion is provided with a radially outwardly projecting flange.

The entire valve is molded in one piece from an elastomeric material which allows flow in a first direction outwardly through the normally closed slit at flow pressures in excess of some preselected first pressure, checks flow through said slit in the opposite direction at pressures below a second pressure, permits relief flow through the slit in the opposite direction at pressures at and in excess of the second pressure, and automatically resets the slit to its normally closed position when the pressure drops sufficiently below the second pressure.

For purposes of illustration a silicone rubber may be used having a Shore A Durometer rating of about 45, and typical operating pressures for an installation may be about 3–4 psi for opening the normally closed slit and a relief pressure of about 10 psi.

While the pressures at which the valve operates can be controlled to a great extent by the selection of the material of which the valve is molded, operating pressures can also be increased through the use of stiffening ribs molded integrally with the valve. In a preferred embodiment, the ribs extend co-extensively with the main body portion and project radially outwardly from it at diametrically opposed positions. With a construction of this type, it will be mainly the non-checking flow pressure through the valve that is increased, although generally the relief pressure will also be increased somewhat.

These and other features and advantages of the present invention will become more apparent from the following description.

BRIEF DESCRIPTION OF THE DRAWINGS

FIG. 6 is a view similar to FIG. 1 but showing a second preferred embodiment of the invention;

FIG. 7 is a cross-sectional view taken on line 7—7 of FIG. 6;

FIG. 8 is a partial cross-sectional view taken on line 8—8 of FIG. 7;

FIG. 9 is a view showing a valve of the present invention installed in a flow port; and FIG. 10 illustrates the valve of the present invention in an exemplary environment.

DESCRIPTION OF THE PREFERRED EMBODIMENTS

Figure 2:
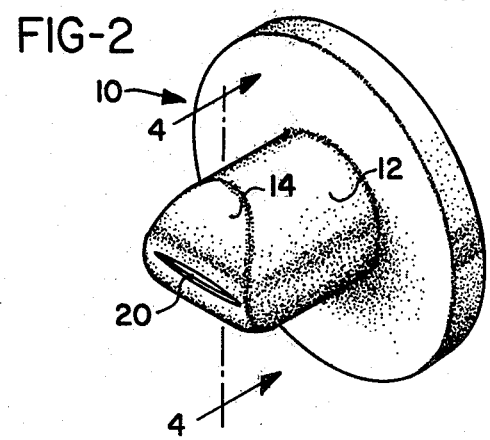
FIG. 2 is a view similar to FIG. 1, but showing the slit open for flow in a first direction.
Figure 3:
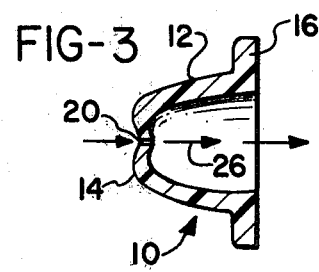
FIG. 3 is a partial cross-sectional view showing the valve in its pressure relief configuration.
Figure 4:
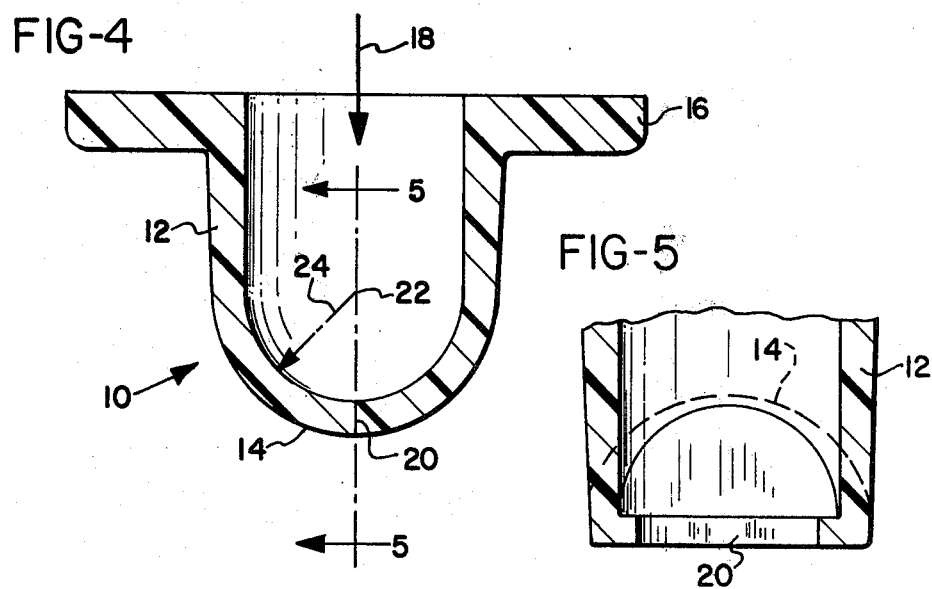
FIG. 4 is a cross-sectional view taken on line 4—4 of FIG. 2.

With reference initially to FIGS. 1 through 5 of the drawings, it will be seen that a combination check-overpressure relief valve 10 in accordance with the present invention includes a hollow, cylindrical, main body portion 12 terminating at one end in a curved lip portion 14 and having a radially outwardly projecting flange 16 at an opposite end. The cylindrical main body portion defines a flow path 18 through the valve, as best seen in FIG. 4 of the drawings.

Figure 5:
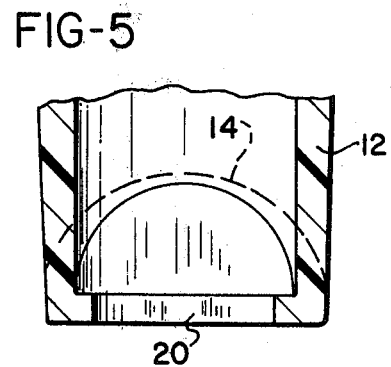
FIG. 5 is a partial cross-sectional view taken on line 5—5 of FIG. 4.

The curved lip portion 14 is provided with a normally closed slit 20 having a length preferably less than the diameter of the main body portion, as best seen in FIG. 5 of the drawings, and extending substantially parallel to the axis of curvature 22 of the curved lip portion 14. Preferably the radius of curvature 24 of the curved lip portion is substantially constant.

Figure 1:
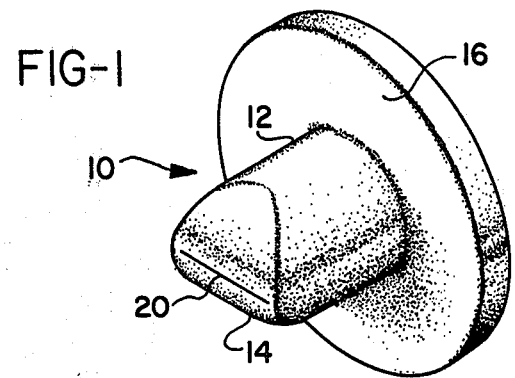
FIG. 1 is a perspective view of a valve in accordance with the present invention showing the slit in its normally closed position.

With the above described construction the slit 20 will normally be closed, as seen in FIG. 1 of the drawings. As the pressure within the valve increases above some preselected value the slit 20 will open, as seen in FIG. 2 of the drawings, to allow flow through the valve in the direction indicated by the arrow 18 in FIG. 4 of the drawings. However, when pressure is applied in a direction opposite to that indicated by the arrow 18, the slit 20 will again close, checking reverse flow through the valve. Reverse flow will continue to be checked until some preselected relief pressure is reached, at which point the curved lip portion 14 collapses inwardly, as seen in FIG. 3 of the drawings, allowing the slit 20 to open and permitting reverse flow through the valve in the direction indicated by the arrows 26 in FIG. 3 of the drawings.

While the material of which the valve is constructed can affect to a great extent the pressures at which the valve will open for normal flow and relief for reverse flow, operating pressures can also be increased through the provision of stiffening means as shown in FIGS. 6, 7 and 8 of the drawings.

Thus, a valve 30, similarly to the valve 10, includes a cylindrical main body portion 32, a curved lip portion 34, a radially outwardly extending flange 36 and a normally closed slit 40, which opens to permit flow in the direction of the arrow 38. However, stiffening means is provided in the form of ribs 42 formed integrally with the main body portion 32. While the form, number and arrangement of the ribs can be varied as desired, the stiffening means can conveniently be formed as a pair of diametrically positioned, radially projecting ribs 32 extending co-extensively with the cylindrical main body portion 42.

As seen in FIG. 9 of the drawings, a valve of the present invention can be installed in a flow port 44 with the flange 36 overlying a shouldered portion 46 and being held in place by an end of a conduit 48. While the valve 30 is shown for purposes of illustration in FIG. 9, and also in FIG. 10 to be discussed below, it will be apparent that the valve 10 can be installed in a similar fashion.

Additionally, it will usually be preferable to form the valve 10 with an outside diameter slightly greater than the inside diameter of the opening within which it is received to provide a slight force fit, while in the case of the valve 30 the outside diameter of the valve, measured from the outer surfaces 50 of the ribs 42, will preferably be slightly greater than the inside diameter of the opening within which the valve is received.

For purposes of illustration a pump 60 is shown in FIG. 10 of the drawings incorporating a valve of the present invention. The pump 60 includes a cylinder 62 slidably receiving a piston 64 and having intake and outlet openings 66 and 68, respectively. In the outlet opening 68 a conventional, one-way duck bill valve 70 can be installed for permitting flow in the direction of the arrow 72 while checking flow in the opposite direction.

At the inlet opening 66 a valve of the present invention, the valve 30 being shown, although the valve 10 could also serve this function, is installed to permit flow in the direction of the arrow 74 while normally checking flow in the opposite direction. However, should pressure build up to a value greater than that desired for flow through the outlet 68, the valve of the present invention will relieve in the manner shown in FIG. 3 of the drawings, preventing damage to components connected to the outlet 68 of the pump.

From the above it will be seen that the present invention provides a combination check-overpressure relief valve which avoids the necessity of separate components such as springs, axial shifting of the entire valve and flow around the outside of the valve body.

While the products herein described constitute preferred embodiments of the invention, it is to be understood that the invention is not limited to these precise products, and that changes may be made therein without departing from the scope of the invention.

What is claimed is:

1. A combination check-overpressure relief valve comprising:
    a substantially cylindrical main body portion having a central longitudinal axis and defining a flow path through said valve,
    said cylindrical main body portion terminating at one end thereof in a lip portion,
    said lip portion having a curved contour about an axis of curvature extending substantially perpendicularly to said flow path, said contour being in a cross section contained within a first plane parallel to said central axis,
    said lip portion having a squared-off contour in a second cross section contained within a second plane being parallel to said central axis and not parallel to said first plane,
    at least one normally closed slit formed along said squared-off contour, and
    said main body and lip portions being formed of an elastomeric material which allows flow through said slit in a first direction at pressures in excess of a first pressure, checks flow through said slit in a second direction opposite to said first direction at pressures below a second pressure, permits relif flow through said slit in said second direction, and resets said slit to its normally closed position when flow pressure in said second direction drops to a value below said second pressure.

2. The valve of claim 1 wherein:
    said curved contour has a substantially constant radius of curvature.

3. The valve of claim 1 wherein:
    said slit is shorter in length than the diameter of said main body portion.

4. The valve of claim 1 further comprising:
    stiffening means associated with said main body portion for increasing at least said first pressure.

5. The valve of claim 4 wherein said stiffening means comprises:
    rib means extending along said main body portion.

6. The valve of claim 5 wherein:
    said rib means are molded integrally with said main body portion.

7. The valve of claim 6 wherein:
    said rib means project radially outwardly of said main body portion.

8. The valve of claim 7 wherein:
    said rib means comprise a pair of diametrically positioned ribs.

9. A combination check-overpressure relief valve comprising:
    a substantially cylindrical main body portion having a central longitudinal axis and defining a flow path through said valve,
    said cylindrical main body portion terminating at one end in a lip portion and at an opposite end in a flange projecting radially outwardly with respect to said flow path,
    said lip portion having a curved contour about an axis of curvature extending substantially perpendicularly to said flow path, said contour being in a cross section contained within a first plane parallel to said central axis, said lip portion having a squared-off contour in a second cross section contained within a second plane parallel to said central axis and normal to said first plane, at least one normally closed slit formed along said squared-off contour in parallel relationship to said second plane of said curved lip portion and having a length less than the diameter of said cylindrical main body portion, a pair of diametrically positioned ribs molded integrally with said main body portion, extending coextensively therewith and projecting outwardly therefrom, said ribs lying in said first plane, and said main body and lip portions being formed of an elastomeric material which allows flow through said normally closed slit in a first direction at pressure in excess of a first pressure, checks flow through said normally closed slit in a second direction opposite to said first direction at pressures below a second pressure, permits relief flow through said slit in said second direction at pressures at and in excess of said second pressure, and resets said slit to its normally closed position when flow pressure in said second flow direction drops to a value below said second pressure.

* * * * *